July 20, 1965　　　A. S. PETRINA　　　3,196,217
MULTIPLE-POSITION SWITCH
Original Filed April 21, 1959
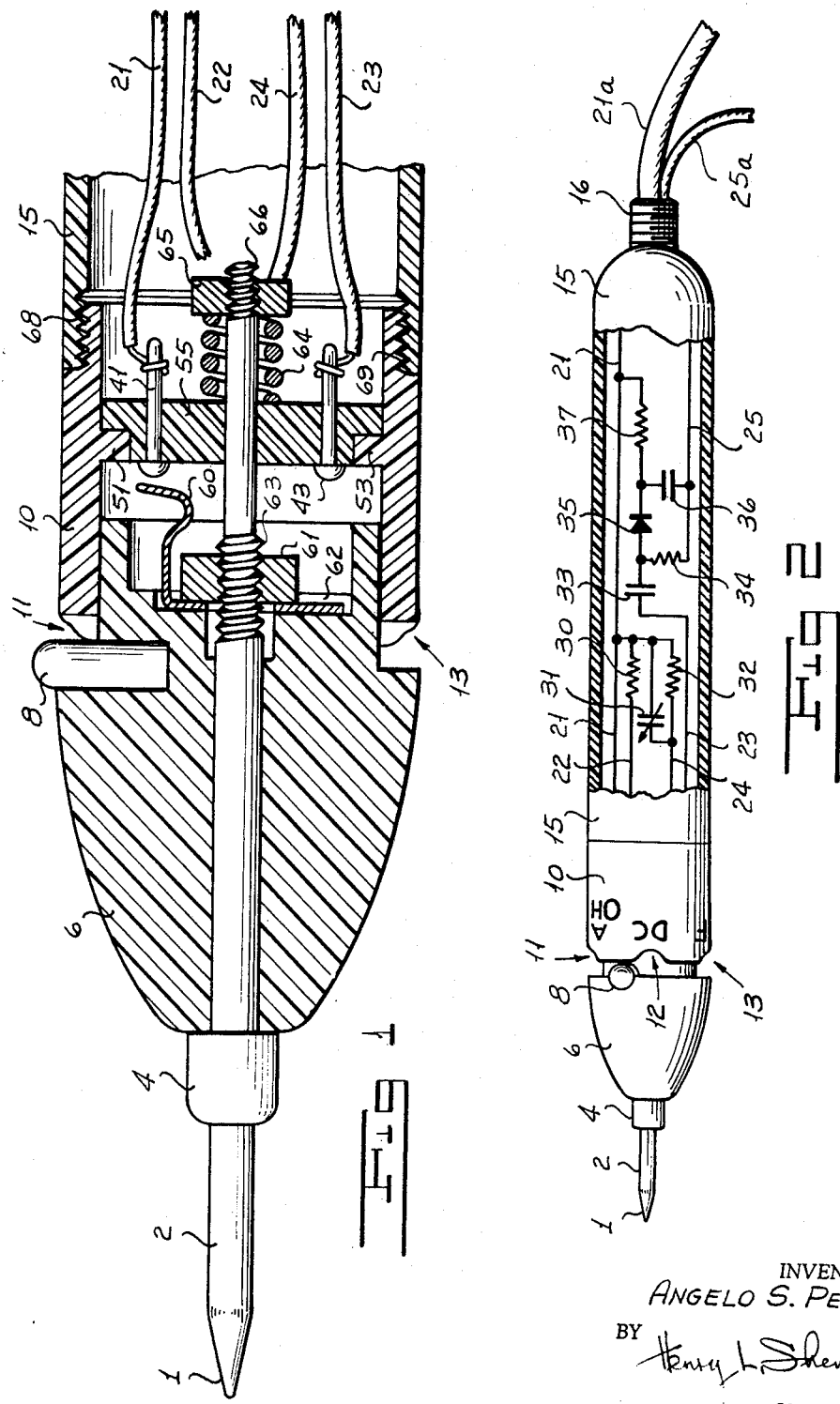
INVENTOR.
ANGELO S. PETRINA
BY Henry L. Shenier
ATTORNEY

United States Patent Office 3,196,217
Patented July 20, 1965

3,196,217
MULTIPLE-POSITION SWITCH
Angelo S. Petrina, Hicksville, N.Y., assignor to Mercury Electronics Corporation, Mineola, N.Y., a corporation of New York
Continuation of application Ser. No. 807,781, Apr. 21, 1959. This application May 10, 1962, Ser. No. 195,659
3 Claims. (Cl. 200—4)

My invention relates to a multiple-position switch and more particularly to a multiple-position probe switch. This application is a continuation of my copending application for Multi-Position Probe Switch, filed April 21, 1959, Serial No. 807,781, now abandoned.

Some probes of the prior art provide an unchangeable impedance to electrical signals so that it is necessary to use a plurality of different probes in order to measure a plurality of different electrical signals. Other probes of the prior art employ a fixed impedance in combination with axially operated means for short-circuiting this impedance thereby to achieve two scales of different ranges to measure the same type of electrical signals. This impedance short-circuiting by axial motion is an extremely limited method of changing the impedance characteristics of the probe.

Accordingly, some electrical probes of the prior art provide only two range scales which of necessity must be limited to measurement of electrical signals of the same nature.

Furthermore, in some multiple-position switches of the prior art, either the contact force is too weak to eliminate any possibility of an open or intermittent circuit or the tolerances are so critical that a short-circuit may easily occur.

One object of my invention is to provide a multiple-position probe in which not only may electrical signals of the same type be measured with different range scales but also various electrical signals of different types may be measured.

Another object of my invention is to provide a multiple-position probe switch wherein a plurality of impedances not only of different values but also of different natures may be provided.

A further object of my invention is to provide a multiple-position switch which may be accurately and positively locked in a plurality of different positions, yet which may be easily moved from one position to another.

Still a further object of my invention is to provide a multiple-position switch having a high contact force to eliminate open or intermittent circuits and having large tolerances so that no short-circuit can occur.

Other and further objects of my invention will appear from the following description.

In general my invention contemplates the provision of an electrical probe having a nose barrel and a front barrel movable relative to one another in both a rotary and a telescoping axial manner. The two barrels are resiliently maintained in a fully telescoped position. An indexing pin is mounted on one of the barrels. The other barrel is provided with a cam surface. The resilient means connecting the two barrels in combination with the indexing pin and cam surface enables the two barrels to be accurately and positively locked in a plurality of different relative positions. A spring armature is electrically connected to the probe rod and maintained in a precise position relative to the nose barrel. The front barrel is provided with a plurality of angularly spaced rigid contacts which are maintained in constant positions relative to the front barrel. Various electrical impedances are connected to these contacts.

In the accompanying drawings which form part of the instant specification and which are to be read in conjunction therewith and in which like reference numerals are used to indicate like parts in various views:

FIGURE 1 is a fragmentary sectional view on an enlarged scale showing the details of my multiple-position probe switch.

FIGURE 2 is an elevational view of my multiple-position probe with parts broken away to show the various electrical connections.

More particularly referring now to the drawings. A probe rod 2, having a tip 1, is formed of some electrically conductive material, such as brass, and is provided with a collar 4. The probe rod 2 extends through a central axial bore in the nose barrel 6. A spring switch armature 60 formed of an electrically conductive and resilient material, such as beryllium copper, is maintained in accurate alignment with nose barrel 6 by means of a locking recess 62 formed therein. Spring armature 60 is formed with a hole through which probe rod 2 extends. A lock nut 61 coacting with threads 63 machined in the probe rod 2 secures probe rod 2 and spring switch armature 60 to the nose barrel 6. Lock nut 61 is formed of some electrically conductive material, such as brass. Nose barrel 6 is provided with a radially extending bore into which is press-fitted an indexing pin 8. If desired, the hole in spring armature 60 and the locking recess 62 may be asymmetrical relative to the axis, as shown, so that only one assembly position is possible. This asymmetrical positioning insures that the spring armature 60 will be aligned with the indexing pin 8 to eliminate any possible 180° ambiguity in assembly. The front barrel 10 is provided with a cam surface forming a plurality of detents indicated generally by the reference characters 11, 12, and 13. I have here shown my probe switch as having four positions; but, as will be appreciated by those skilled in the art, a greater or lesser number of positions may be provided. In FIGURE 2, the fourth cam surface detent of front barrel 10 is not visible; and in FIGURE 1 neither of the second or fourth cam surface detents is visible. Nose barrel 6 is adapted to slide both axially and rotatably within front barrel 10. Front barrel 10 is provided with positioning lugs 51 and 53. A wafer 55 is mounted within the front barrel 10 and is provided with positioning recesses which coact with positioning lugs 51 and 53 thereby to maintain wafer 55 in a predetermined position relative to front barrel 10. If desired, positioning lugs 51 and 53 and the coacting positioning recesses in wafer 55 may be either of different sizes or asymmetrically positioned so as to remove any possible 90° or 180° ambiguity if the probe is disassembled and then reassembled. Four rigid contact pins are provided of which only contact pins 41 and 43 are visible. These rigid contact pins such as 41 and 43, are press fit in holes formed in wafer 55. The heads of pins 41 and 43 extend toward the nose barrel and hence toward spring armature 60. Probe rod 2 extends through a central hole in wafer 55. An indexing spring 64 is maintained in compression between wafer 55 and a nut 65 which coacts with threads 66 machined in the end of probe rod 2.

The positioning recesses formed in wafer 55 which coact with positioning lugs 51 and 53 of front barrel 10 are placed on that side of wafer 55 remote indexing spring 64 in order to sustain the compression thereof. The rear barrel 15 is formed with internal threads 68; and the front barrel 10 is formed with external threads 69. Thus the rear barrel 15 is secured to the front barrel 10. An electrical conductor 21 is wrapped around the shank of pin 41 and secured thereto by soldering. A conductor 23 is wrapped around the shank of pin 43 and secured thereto by soldering. Similarly, conductor 22 is electrically connected to the shank of a second contact pin, and a conductor 24 is electrically connected to the shank of a fourth switch contact pin.

In operation of my multiple-position probe switch in the position shown, indexing pin 8 rides on the outer surface of the cam track formed in front barrel 10 intermediate the detents 11 and 12 causing an appreciable compressional force in indexing spring 64. Preferably when indexing pin 8 is intermediate two adjacent cam surface detents of front barrel 10, spring armature 60 rides well clear of the rigid contact pins 41 and 43, as shown, so that the armature cannot jam against the pin heads at the surface of wafer 55. As the nose barrel 6 is rotated relative to the front barrel 10, indexing spring 64 will expand, causing indexing pin 8 to drop into cam surface detent 11 and causing spring armature 60 to engage the head of rigid contact pin 41 before nose barrel 6 and front barrel 10 have reached the fully telescoped position. Spring armature 60 will be compressed and will exert appreciable force against the head of rigid contact pin 41. The path of electrical current proceeds from the probe rod tip 1, through the probe rod 2 and the lock nut 61 and the spring armature 60 to the head of rigid contact pin 41, and thence through the shank of pin 41 to conductor 21. Accordingly, at least nose barrel 6 and wafer 55 should be formed of some insulating and non-conductive material, such as a plastic resin or the like. Preferably front barrel 10 and rear barrel 15 are likewise formed of a plastic resin. As the nose and front barrels are moved to new relative positions there will occur sufficient wiping action between spring armature 60 and rigid contact pin 41 to ensure low resistance electrical engagement.

Referring now to FIGURE 2, when indexing pin 8 is locked in detent 11, I may measure alternating-current voltage and ohms (A.C.-ohms). When indexing pin 8 is in detent 12, I may measure direct-current voltage (D.C.). When indexing pin 8 is in detent 13, I may measure radio-frequency voltage (RF). When indexing pin 8 is in the fourth detent, I may measure alternating-voltage with but a low capacitance loading (Lo-Cap). Conductor 22 carries a signal when it is desired to measure "D.C." voltage. Conductor 22 is connected through a resistor 30 to conductor 21. Resistor 30 may have a 1 megohm, 1%, resistance value. Conductor 24 carries a signal when it is desired to measure alternating current voltage with but a "Lo-Cap" shunting effect. Conductor 24 is connected through a parallel combination of a resistor 32 and a variable capacitor 31 to conductor 21. Resistor 32 may have a 9 megohms, 1%, resistance value. Capacitor 31 may be variable between capacitance values of 3 and 35 micromicrofarads. The time-constant of resistor 32 and variable capacitor 31 should be made equal to the time-constant of the particular vacuum-tube-voltmeter in conjunction with which my probe is being used. Conductor 23 is energized when it is desired to measure "RF" voltage. Conductor 23 is connected to one plate of capacitor 33. The other plate of capacitor 33 is connected through a resistor 34 to a conductor 25. Capacitor 33 may have a 1,000 micromicrofarads capacitance value. Resistor 34 may have a 1.2 megohms resistance value. The junction of capacitor 33 and resistor 34 is connected forwardly through a crystal 35 to one plate of a capacitor 36. The other plate of capacitor 36 is connected to conductor 25. Capacitor 36 may have 100 micromicrofarads capacitance value. The junction of the cathode of crystal 35 and capacitor 36 is connected through a resistor 37 to conductor 21. Resistor 37 may have a 220 kilohms resistance value. A connector 16 mounted in the rear end of the rear barrel 15 maintains conductor 21 in electrical contact with an output conductor 21a and maintains conductor 25 in electrical contact with a grounding conductor 25a. For measurements of "D.C." and "A.C.-ohms" and for "Lo-Cap" measurements, grounding conductor 25a is left floating. However, for measurements of "RF," conductor 25a is connected to some source of reference potential, such as ground, as will be appreciated by those skilled in the art. It will be noted that each of the contact pins is connected through appropriate impedances to the common conductor 21 and thence through connector 16 to the output conductor 12a. These impedances are not only of different values but also are of different natures.

It will be seen that I have accomplished the objects of my invention. I have provided a multiple-position probe adapted to measure electrical signals of different types. I have provided a multi-position probe having a plurality of impedances of different natures. I have provided a multiple-position probe switch which is positively and accurately locked in any one of a plurality of different positions, yet which may be readily moved from one position to another. My multiple-position probe switch provides a low resistance connection without possibility of either an open or intermittent circuit or of a short-circuit.

It will be understood that I am not to be limited to a four-position switch, since a fewer or a greater number of positions may be provided. While the electrical impedances shown and described are those which I believe best adapted for the particular types of measurements indicated, it will be appreciated that different impedances may be used for the same types of measurements and that differentt impedances would be provided for measurements of types different from those indicated.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A multiple position switch including in combination, a first member, a plurality of contacts at spaced discrete locations along a path on said first member, a second member, a switch armature carried by said second member, means mounting said first and second members for relative movement in a first direction parallel to said path and for relative movement in a second direction generally perpendicular to the plane of said path between a first position at which said switch armature is in a second path parallel to and spaced in said second direction from said first path, said second path being clear of said contacts, and a second position at which said armature is in said path and means responsive to relative movement of said members in said first direction for urging said members to said first position between said locations and for urging said members to said second position at said locations.

2. A multiple position switch including in combination, a first member, a plurality of contacts at spaced discrete locations along a generally circular path on said first member, a second member, a switch armature carried by said second member, means mounting said first and second members for relative rotary movement generally parallel to said circular path and for relative axial movement generally perpendicular to the plane of said path between a first position at which said switch armature is in a second path parallel to and spaced in an axial direction from said first path, said second path being clear of said contacts, and a second position at which said armature is in said path and means responsive to relative rotary movement of said members for urging said members to said first position between said locations and for urging said members to said second position at said locations.

3. A multiple position switch including in combination, a first member, a plurality of contacts at spaced discrete locations along a generally circular path on said first member, a second member, a switch armature carried by said second member, means mounting said first and second members for relative rotary movement generally parallel to said circular path and for relative axial movement generally perpendicular to the plane of said path between a first position at which said switch armature is in a second path parallel to and spaced in an axial direction from said first path, said second path being clear of said contacts, and a second position at which said armature is in said path, means forming a cam track provided with recesses at locations corresponding to said discrete locations on one of said members, a cam element on the other member adapted to engage in said recesses, said cam element being located at a location corresponding to the location of a switch armature and a spring for urging said cam element into engagement with said cam track whereby said members move to said first position between said locations in response to relative rotary movement and move to said second position at said locations in response to relative rotary movement.

References Cited by the Examiner

UNITED STATES PATENTS 2,790,051  4/57  Sicho _____ 200—157

OTHER REFERENCES

Kitzingen: German Application 1,022,671, Jan. 16, 1958.

"The Multi-Purpose Scope Probe," article in Radio and TV News, January 1958, page 52.

ROBERT K. SCHAEFER, *Primary Examiner.*

BERNARD A. GILHEANY, *Examiner.*